United States Patent
Lareau et al.

[11] Patent Number: 6,088,055
[45] Date of Patent: *Jul. 11, 2000

[54] ELECTRO-OPTICAL IMAGING ARRAY AND CAMERA SYSTEM WITH PITCH RATE IMAGE MOTION COMPENSATION

[75] Inventors: Andre G. Lareau, Bloomingdale; Russell A. Bennett, McHenry; Steven R. Beran, Mount Prospect; Michael Bown, McHenry; George Hines, Wonder Lake, all of Ill.

[73] Assignee: Recon /Optical, Inc., Barrington, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/163,088
[22] Filed: Sep. 29, 1998

Related U.S. Application Data

[63] Continuation of application No. 08/646,509, May 7, 1996, Pat. No. 5,798,786.

[51] Int. Cl.⁷ ................................................. H04N 7/18
[52] U.S. Cl. ................................ 348/113; 348/144
[58] Field of Search ................................ 348/295, 208, 348/145, 144, 146, 147, 148, 113; H04N 7/18

[56] References Cited

U.S. PATENT DOCUMENTS

| | | |
|---|---|---|
| 4,033,541 | 7/1977 | Malueg . |
| 4,157,218 | 6/1979 | Gordon ...................................... 354/66 |
| 4,505,559 | 3/1985 | Prinz ........................................ 354/66 |
| 4,747,155 | 5/1988 | Dotson ...................................... 382/42 |
| 4,908,705 | 3/1990 | Wight ...................................... 358/109 |
| 5,124,938 | 6/1992 | Algrain . |
| 5,155,597 | 10/1992 | Lareau et al. ...................... 358/213.24 |
| 5,231,502 | 7/1993 | Pfister ............................... 358/213.11 |
| 5,278,660 | 1/1994 | Sugiki ............................... 358/213.22 |
| 5,486,859 | 1/1996 | Matsuda .................................. 348/311 |
| 5,526,045 | 6/1996 | Oshima et al. .......................... 348/208 |
| 5,604,534 | 2/1997 | Hedges et al. .......................... 348/144 |
| 5,647,558 | 7/1997 | Liinick .................................. 244/3.11 |
| 5,668,593 | 9/1997 | Lareau et al. .......................... 348/146 |
| 5,692,062 | 11/1997 | Lareau et al. .......................... 382/107 |
| 5,712,678 | 1/1998 | Hofmann ................................ 348/146 |
| 5,751,578 | 5/1998 | Quinn . |
| 5,844,602 | 12/1998 | Lareau et al. .......................... 384/144 |

FOREIGN PATENT DOCUMENTS

WO 982031  5/1998  WIPO .

OTHER PUBLICATIONS

D. Kawachi, Image Motion Due To Camera Rotation, Photogrammetric Engineering vol. 31 (5) pp. 861–867 (1965).

D. Light, Film Cameras or Digital Sensors! The Challenge Ahead for Aerial Imaging, Photogrammetric Engineering & Remote Sensing, vol. 65 (3) pp. 285–291, Mar. 1996.

R. Ruck, Design Versatility of the Prism Pnoramic Camera; The KS–116 and KA–95 cameras, vol. 309, SPIE Proceedings, paper 909–10, p.65 (Aug. 27–28, 1981).

*Primary Examiner*—Howard Britton
*Attorney, Agent, or Firm*—McDonnell Boehnen Hulbert & Berghoff

[57] ABSTRACT

A camera system is described which is based on an electro-optical imaging array performs electronic image motion compensation without moving parts during a reconnaissance maneuver in which the aircraft is experiencing a non-zero rate of change in the pitch axis, such as in a dive bomb maneuver when the pilot is pulling out of the dive. The camera system has a camera control computer that calculates a pixel information transfer rate for the array based on parameters supplied by the aircraft's navigation system and pre-mission known parameters, including the aircraft's velocity, height above ground, attach angle, pitch angle, and rate of change in pitch during the period in which the array is taking successive exposures of the scene. The camera control computer supplies information to the drive and control electronics that control the transfer of pixel information in the array. In a preferred embodiment, the array is exposed to the scene of interest in a series of rapid exposure intervals and generates a frame of imagery during each exposure. By virtue of the electronic image motion compensation, each frame of imagery is a high resolution image of the scene of interest, far surpassing images created by an electro-optical array if the present image motion compensation technique were not performed.

11 Claims, 9 Drawing Sheets

TYPICAL DIVE-BOMB PASS

FMC – FORWARD MOTION COMPENSATION
PRC – PITCH RATE CORRECTION

ELECTRO-OPTICAL IMAGING ARRAY AND CAMERA SYSTEM WITH PITCH RATE IMAGE MOTION COMPENSATION

RELATED APPLICATION

This is a continuation of application Ser. No. 08/646,509 filed May 7, 1996, now U.S. Pat. No. 5,798,786, which is incorporated by reference herein.

BACKGROUND OF THE INVENTION

This invention relates to the art of aerial reconnaissance photography, and more particularly to the operation of an array-type electro-optical imaging sensor used in aerial reconnaissance photography.

STATEMENT OF RELATED ART

It is well known in the aerial reconnaissance art that photographs of a terrain of interest taken by an electro-optical or film-type of camera installed in a moving platform (such as an aircraft) will be degraded in quality and resolution unless some type of image motion compensation is performed. The image degradation is caused by relative motion between the image of the scene of interest and the image recording medium. Historically, image motion compensation in both film and electro-optical types of camera systems has been performed by one of a variety of complex optical and/or mechanical systems involving moving parts, such as those involving moving the film, providing translating lenses or rotating prisms, or maintaining the sensor array stationary and moving a slit over the array. The basic principle of operation of these systems is to make the image of the scene of interest essentially stationary relative to the image recording medium during the exposure period.

Electro-optical imaging arrays are becoming increasingly viewed as the image recording medium of choice. Such devices are capable of generating high resolution images which can be converted into digital form. Such arrays are typically composed of a large number (upwards of 4 million) of individual photosensitive cells or pixels arranged in row and column fashion in an array. In a charge-coupled device type of sensor, each cell converts incident electromagnetic radiation into electrical charge which is stored in a potential well in the substrate of the array. The potential wells associated with each individual cell are controlled by sets of conductors on the surface of the array. Voltage pulses applied to the conductors regulate the storage of charge within the cell and the ability of the cells to shift charge from one cell to a cell in an adjacent row. If the charge (representing scene information) is transferred row by row at the same speed as the radiation from the scene is moving across the array, the image generated by the array will not be blurred.

More recently, a substantial advance in the art occurred when an electro-optical imaging array-type of camera system was developed that performs forward motion compensation electronically in the detector (i.e., "on-chip") without using moving parts. This array is described in the Lareau et al. Patent, U.S. No. Pat. 5,155,597, assigned to Recon/Optical, Inc., the assignee of the present invention. The Lareau '597 patent is incorporated by reference herein. The Lareau et al. patent describes a novel technique for performing image motion compensation electronically when the camera is oriented in a forward oblique position relative to the aircraft. However, the discussion of forward oblique reconnaissance described in the Lareau et al. patent was directed to a situation in which the aircraft maintained a constant pitch angle (e.g., the aircraft was in level flight as it approached the terrain of interest) while the array is exposed to the scene.

In military applications, aerial reconnaissance cameras are employed in various types of aircraft, including tactical aircraft. Such aircraft often operate in hostile environments where enemy countermeasures must be taken into consideration by the pilot In order to minimize the exposure of the crew and aircraft to hostile threats, the pilot may fly the aircraft in a maneuver known as a "dive bomb" maneuver. In such a maneuver, the pilot approaches the scene of interest at an attack angle, say 30 degrees below horizontal, and then pulls up sharply out of the dive after the target image has been captured and flies away in a straight line in a climb or banking the aircraft to one side.

The present inventors have developed an electro-optical imaging array type of camera system which has the capability of taking aerial reconnaissance photographs during situations in which the pitch attitude of the plane is not constant, such as when the aircraft pulls out of the dive bomb maneuver. The problems associated with compensation for the image motion in the focal plane of the camera in this situation are formidable. The inventors have determined that the image motion that has to be compensated for is not just a function of aircraft velocity and altitude, but also the attack angle, the depression angle of the camera relative to the roll axis of the aircraft, and the pitch rate (for example, the rate at which the pilot pulls out of the dive). As described in detail below, the present invention provides a methodology and aerial reconnaissance camera system which can be effectively employed in this type of maneuver. The invention results in a camera system that provides pictures with superior resolution, due to the invention's ability to synchronize the rate of transfer of charge, or scene information, in the array of cells with the image motion in the focal plane of the imaging array. Thus, the primary object of the invention is to describe a method and electro-optical camera system that accomplishes image motion compensation during conditions in which the aircraft is experiencing a change in the pitch of the aircraft between scene exposures.

SUMMARY OF THE INVENTION

An electro-optical camera system is provided which accomplishes pitch rate image motion compensation. The camera system is suitable for installation in a reconnaissance aircraft having a navigation or avionics system determining the velocity, height, attack angle and pitch angle of the aircraft during a reconnaissance maneuver. The camera system comprises an array of photosensitive cells arranged in rows and columns. The cells store pixel information representing a scene of interest. Drive and electronic control circuitry is provided for the array for transferring pixel information stored in the cells from one row to an adjacent row in synchronism with the motion of the image of the scene of interest.

The camera system includes a camera control computer responsive to the navigation system for computing a pixel information transfer rate for the array of cells based on the velocity, height, pitch angle and pitch rate of the aircraft. The camera control computer determines a pixel information transfer rate for the array of cells during a condition in which the aircraft is experiencing a non-zero rate of change of the pitch angle of the aircraft, and in which the array is oriented in a forward oblique orientation relative to the aircraft.

The camera control computer adjusts the charge transfer rate for the array to substantially match the rate of image motion of the terrain of interest during successive exposures of the array to the terrain of interest during the period in which the aircraft is experiencing a non-zero rate of change in pitch. As a result, the camera system's array generates a series of images of the terrain of interest during the maneuver, while preserving resolution of each of the images generated by the array.

BRIEF DESCRIPTION OF THE DRAWINGS

The detailed description of the preferred embodiment of the invention will be described in conjunction with the appended drawings, in which like reference numerals depict like elements in the various views, and in which.

DETAILED DESCRIPTION OF THE PREFERRED EMBODIMENT

Figure 1:
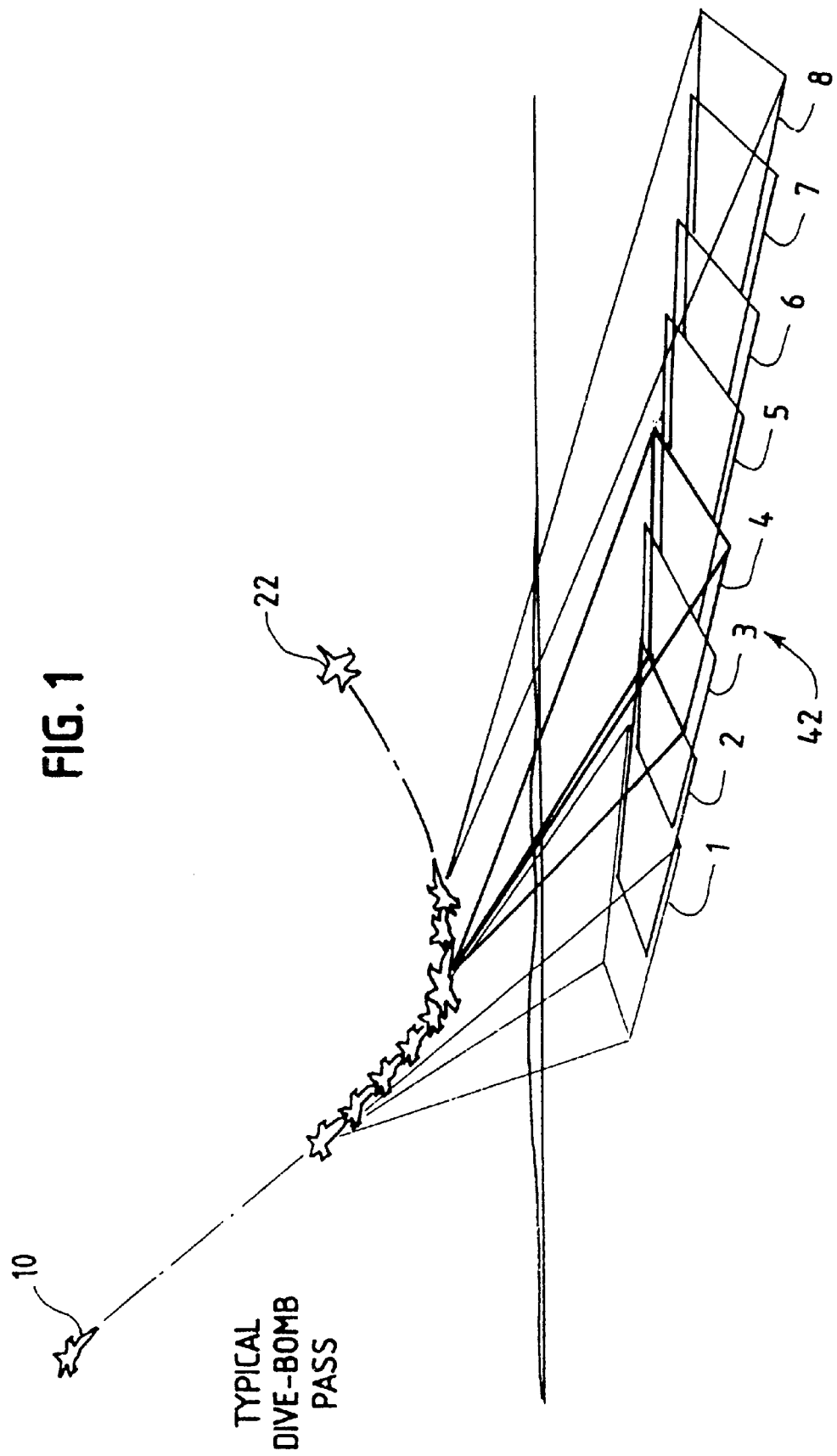
FIG. 1 is an illustration of a reconnaissance aircraft performing a "dive bomb" maneuver with the aerial reconnaissance camera taking a series of frames of imagery in a forward oblique orientation. The camera system installed in the aircraft performs electronic image motion compensation with no moving parts during each of the exposures, in accordance with the techniques described herein.

FIG. 1 illustrates a representative scenario in which the invention may be practiced. A reconnaissance aircraft 22 is shown performing a "dive bomb" maneuver, during which the aerial reconnaissance imaging array of the present camera system invention takes a series of frames of imagery 1–8 of the terrain of interest 42. The imaging array (not shown in FIG. 1) is installed in the aircraft 22 such that it images terrain in a forward oblique orientation during each of the exposures. The camera system provides for electronic image motion compensation in the imaging array with no moving parts during each of the exposures, in accordance with the techniques described herein.

During the dive bomb maneuver shown in FIG. 1, the aircraft 22 approaches the terrain at a steep attack or pitch angle at position 10, such as a 40 degree angle below horizontal. In the illustrated embodiment, the first three frames (frames 1–3) are taken with a constant non-zero pitch angle, but the pitch angle may change if necessary. When the aircraft is considered sufficiently close to the scene of interest 42, the aircraft starts to pull out of the dive and the camera system is operated to take the series of exposures 4–8. During the intervals between exposures 4–8, the pitch attitude of the aircraft changes, significantly changing the rates of image motion in the plane of the imaging array in the camera system. In accordance with the present invention, and as described in more detail below, a camera control computer is supplied with information as to the current velocity, height, aircraft pitch angle and rate of change of pitch from the aircraft's navigation system. The computer calculates from this information (along with other parameters) a pixel information transfer rate for the array for each exposure. The calculated rate is substantially the same as the rate of image motion for a designated location in the array. Charge representing scene information is transferred from row to adjacent row in accordance with the calculated transfer rate. The pixel information transfer rate is updated for each successive exposure of the array, so as to take into account the changes in aircraft pitch, height, etc. Thus, the aircraft generates a set of images for the scene of interest which have image motion compensation to preserve the resolution of the images.

Camera System Design and Operation

Figure 2A:
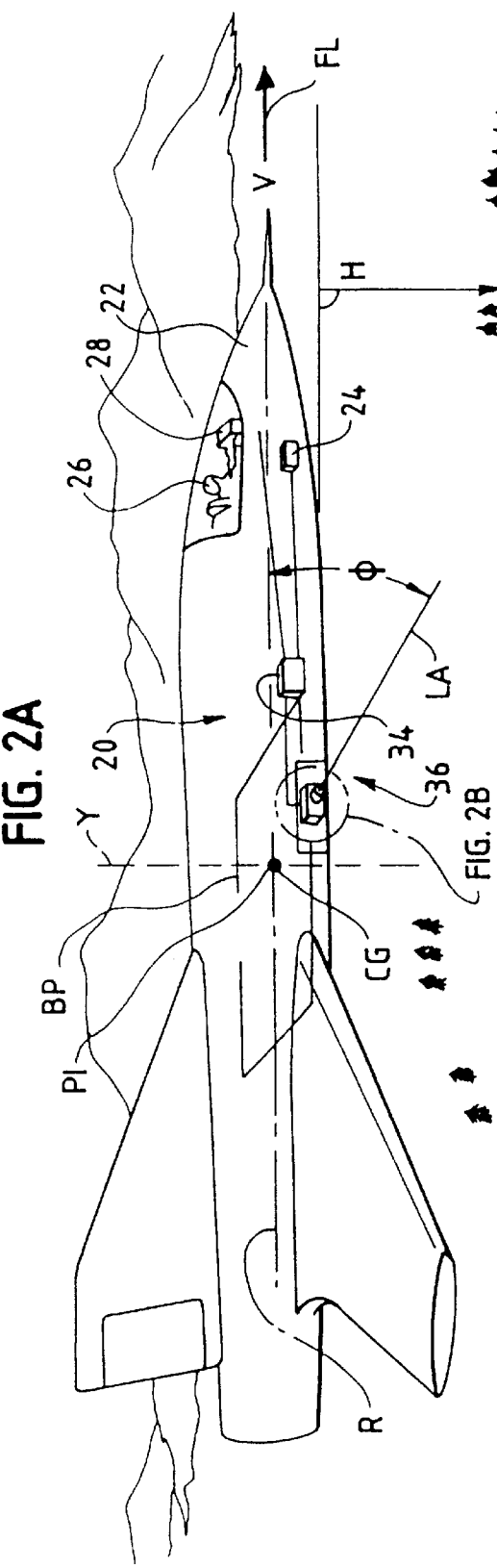
FIGS. 2A and 2B are more detailed illustrations of the camera system and camera assembly used in the aircraft of FIG. 1.

Referring to FIG. 2A, a preferred form of the invention takes the form of a reconnaissance camera system 20 installed in the aircraft 22. The aircraft 22 defines roll, pitch and yaw axes R, PI ,Y respectively, each passing through the center of gravity CG. The roll and pitch axes define a bilateral plane BP containing roll axis R that is horizontal during level flight The system 20 includes a camera assembly 36 defining a lens axis LA that can be directed towards the scene of interest.

The aircraft 22 has an avionics system 24 which provides to the system 20 input signals indicating aircraft ground velocity V, aircraft height above ground H and aircraft roll, pitch and yaw angular position data. From the pilot's console 28, an operator 26 provides additional inputs into the system 20, such as the depression angle φ between the lens axis LA and the plane BP. The inputs from the avionics system 24 and console 28 are fed to a camera control computer 34 which processes the inputs, together with preprogrammed information, and generates control signals for the camera assembly 36.

Figure 2B:
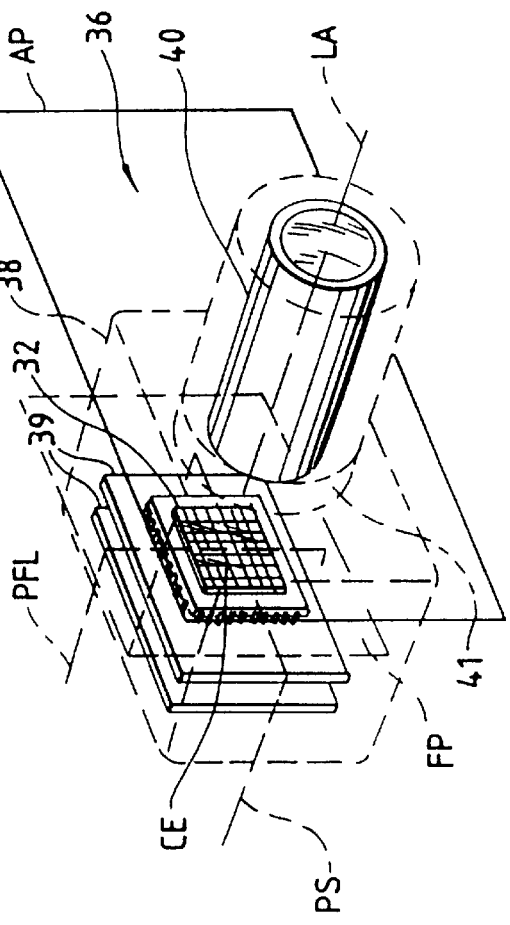

Referring to FIG. 2B, the camera assembly 36 includes an imaging array 32 defining a focal plane FP having a center point CE. The camera assembly 36 also includes a housing 38 and a lens 40 having a focal length F (not shown in FIG. 2B) and defining a lens axis LA that passes through the point CE. A shutter 41 is provided to selectively expose the array 32 to radiation from the scene. Typically, the housing 38 is isolated from the aircraft 22 in order to reduce vibration or other high frequency, low amplitude motions. Printed circuit cards 39 incorporate the electronics that support operation of the array 32. The focal plane array 32 may be installed in a cooled chamber in order to reduce dark current noise in the array 32 substrate.

While in FIG. 2A the imaging array is shown in the fuselage of the aircraft 22 and oriented towards the side of the aircraft, in practice it may also be mounted in a pod beneath the aircraft. The orientation of the imaging array 36 relative to the aircraft (such as side oblique or forward oblique) may be changed by how the array 36 is mounted in the aircraft 22 or by providing suitable mechanical mounting and pointing arrangements in the pod to allow the array to be moved by the operator 28 into different positions. In accordance with the dive bomb maneuver of FIG. 1, it is preferred to orient the array 32 in a forward oblique position such that the array is pointed directly forward of the aircraft and at a depression angle φ of perhaps between 10 and 40 degrees. The selected depression angle φ depends on several factors such as the attack angle and the expected rate at which the aircraft pulls out of the dive, and the nature of the hostile threat. Additionally, the depression angle preferably remains constant during the generation of the set of images, but this does not necessarily have to be the case.

Figure 3:
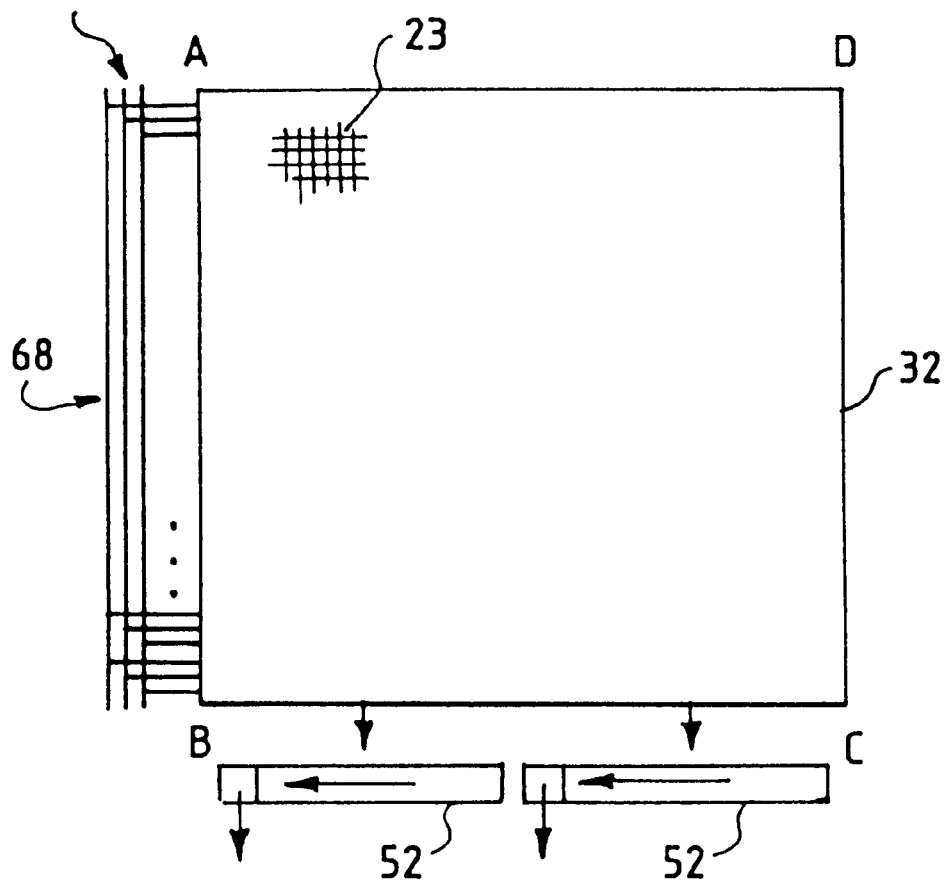
FIG. 3 is a schematic representation of the imaging array of the camera system of FIG. 2B.

FIG. 3 shows schematically the imaging array 32. It comprises a large number of individual pixel elements 23 arranged in a rectangular array of rows and columns. A representative size for the array 36 is 5,000 pixels in the row direction and 5,000 pixels in the column direction, for a total of 25 million pixel elements. A pixel count of at least 4,000,000 is preferred in a military reconnaissance application of the invention. Preferably, the array 32 takes the form of a charge-coupled device. The transfer of charge representing scene information from row to row is controlled by a set of clock lines 68 from a drive and control electronics circuitry described in detail below. During the exposure period, the shutter 41 (FIG. 2B) for the camera opens, light impinges on the pixels 23 of the array 32, and the charge stored in the pixels 23 representing scene information is transferred uniformly from row to adjacent row in the entire array 32 in synchronism with the image from the scene. Immediately upon the closing of the shutter ending the exposure, the charge in each of the rows of the array 32 is read out sequentially to readout registers 52 and sent to signal processing circuitry as described below.

Figure 4:
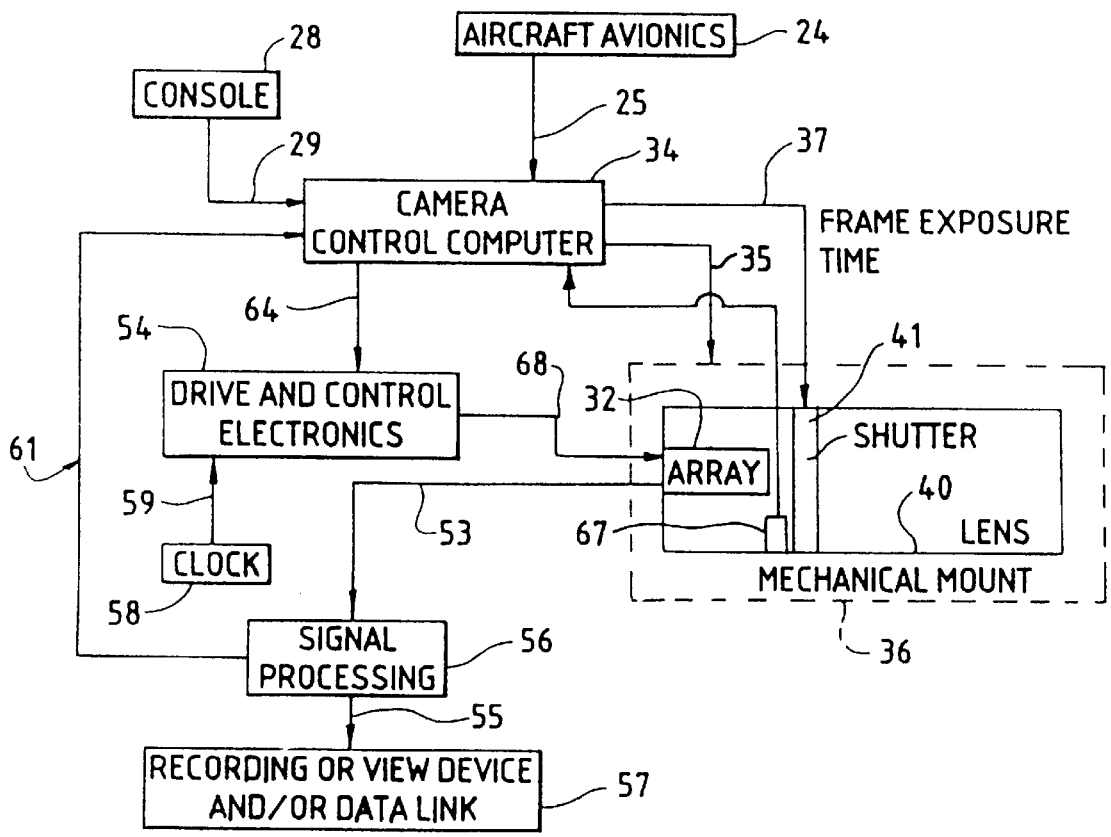
FIG. 4 is a block diagram of the overall camera system of FIG. 2B showing the relationship between the elements of the camera system.

FIG. 4 shows the camera assembly 36 and its associated control circuitry in block diagram form. The avionics system 24 provides velocity and height information over a bus 25 as inputs to the camera control computer 34, in addition to pitch attitude and the rate of change of pitch during the pull up out of the dive. From console 28, the operator inputs into computer 34 over a bus 29 a depression angle φ in degrees. Stored in the memory for the computer 34 are mission parameters that are previously determined, such as the focal length of the lens 40, the mode of operation (e.g., forward oblique), the size of the array, the pixel size, and the master clock frequency.

After processing the inputs, the computer transmits signals over a bus 37 that controls the frame exposure period by enabling opening and closing of the shutter 41, and transmits command signals over a bus 64 to the drive and control electronics 54 for the array 32. The drive and control electronics 54 transmits over a bus 68 signals that allow charge representing scene information to be transferred row by row through the array 32. The computer 34 functions as a means for adjusting the transfer rates depending on the aircraft flight parameters, such as pitch angle, pitch rate, velocity, height, etc. A master clock 58 issues pulses over a conductor 59 at a predetermined master clock frequency to the drive and control electronics 54. Alternatively, the master clock pulses could be provided by the computer 34.

Scene information in the array is fed over a bus 53 to a signal processing unit 56 which converts the signals to digital form and sends the information over a bus 55 to a recording or viewing device or to a data link for transmission to a remote location. The signal processing unit 56 also provides exposure control feedback to the computer 34 over a bus 61 so that the frame exposure time may be adjusted to optimize signal collection.

A shutter detector 67 senses the actual shutter exposure time, providing feedback to the computer 34 to precisely start and stop the counter and clock driver in the drive and control electronics 54, described below.

Figure 5:
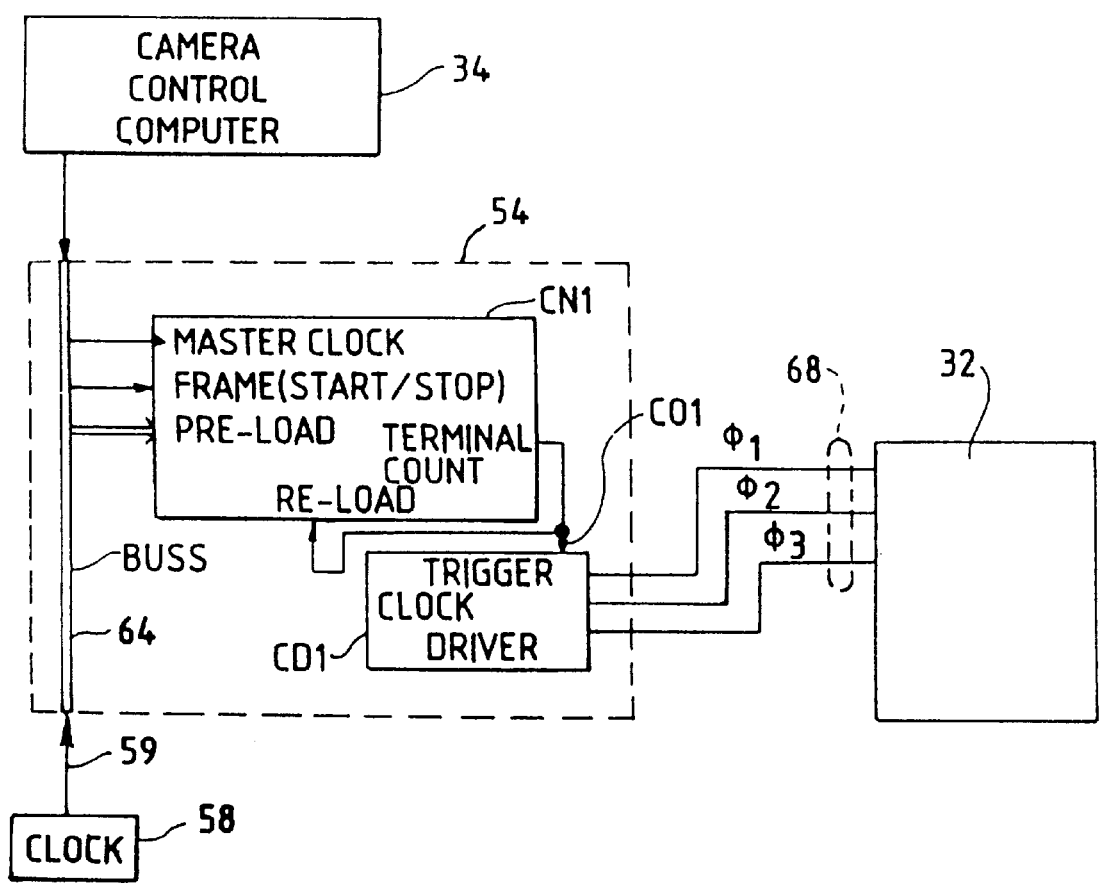
FIG. 5 is a block diagram of the drive and control electronics for the array of FIG. 4.

FIG. 5 shows the drive and control electronics 54 of FIG. 4. The drive and control electronics circuit 54 has a counter CN1 and a clock driver CD1 that receives a trigger signal along conductor CO1 from counter CN1. The camera control computer 34 supplies the drive and control electronics with a master clock signal, frame start and stop signals and a pre-load or counter value signal along a bus 64. Alternatively, the master clock signals may by provided by the clock 58. The frame start and stop signals define the period in which the array 32 is exposed to the scene of interest. The pre-load signal represents a certain number value, which when counted up to by the counter CD1 at the master clock frequency, indicates that a transfer of charge in the array from one row to the next needs to occur. Thus, upon receipt of the frame start signal, the counter CN1 starts counting at the master clock frequency up to a preload or terminal count number (e.g., 4,336) associated with the pre-load signal. When the terminal count is reached, the counter CN1 issues a signal to the trigger input of the clock driver CD1 along conductor CO1, causing the clock driver CD1 to place a set of three-phase clock voltage signals φ1, φ2, φ3 on conductors 68. The clock pulses transfer charge from one row to an adjacent row in the array 32. The trigger signal from the counter CN1 is also sent to a reload input, which causes the counter CN1 to reset to zero and begin counting up to the terminal count again. The cycle of counting and triggering is repeated a predetermined number of times during the exposure period to cause the correct number of pixel information transfers from row to adjacent row, at the desired rate, such that the charge transfer is in synchronism with the image motion.

Of course, during successive exposures of the array, the rate of image motion may change, requiring a different terminal count to be supplied to the counter CN1. The camera control computer 34 calculates the required terminal count or pre-load signal depending on the aircraft motion parameters (including change in pitch angle), as described in more detail below.

In one possible embodiment of the camera system, the array 32 may be manufactured with multiple column groups. A set of counters and clock drivers for each column group may be provided in the drive and control electronics 54. Such an embodiment would allow the camera to also generate side oblique images of the scene of interest, in the manner described in the above-referenced Lareau et al. patent, incorporated by reference herein. In such an embodiment, all the column groups would be subject to the same transfer rates during the forward oblique dive bomb maneuver of FIG. 1.

Figure 6:
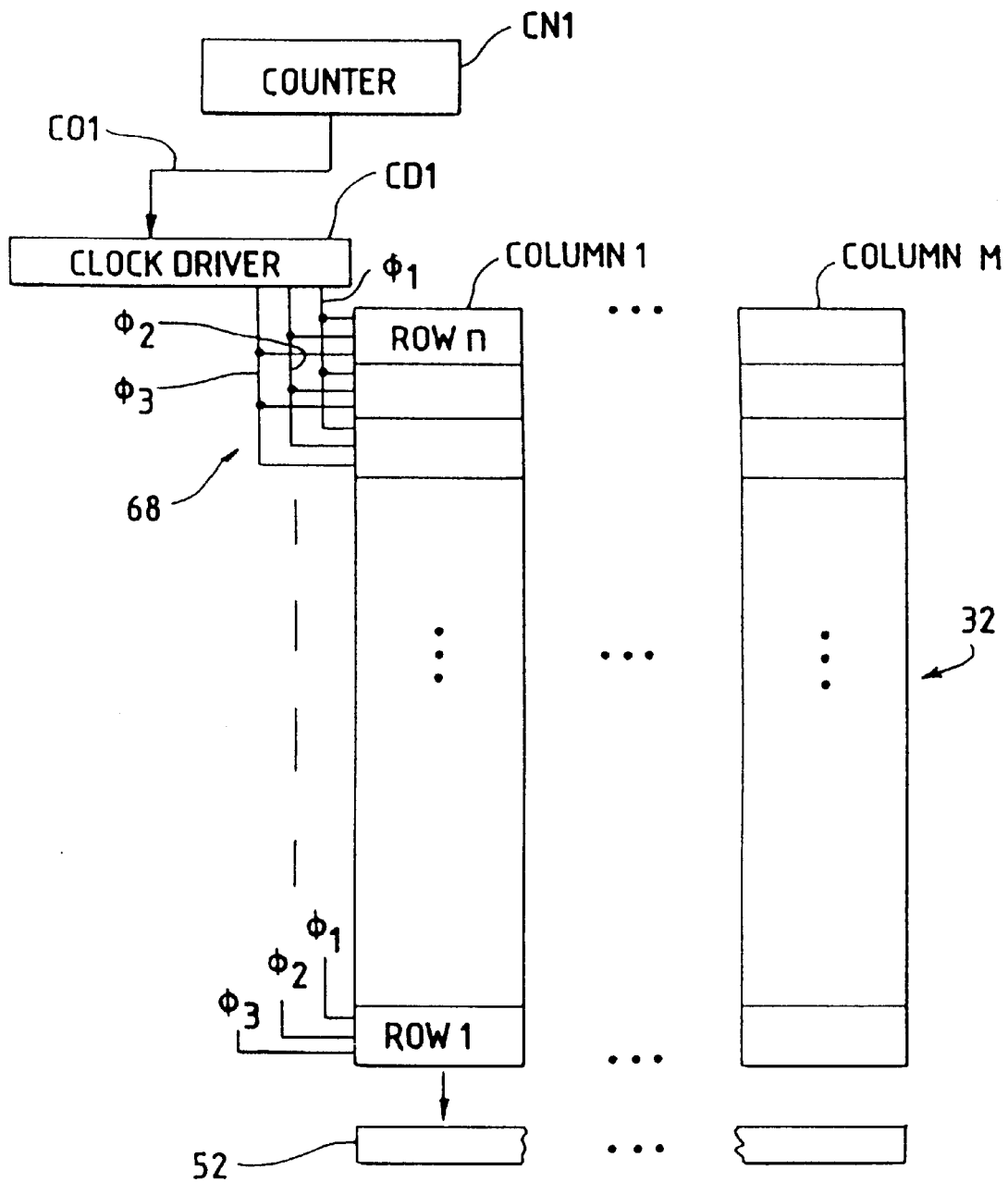
FIG. 6 is a detailed view of the clock lines that control the movement of charge through the array.

Referring now to FIG. 6, the clock lines controlling the rows of the array 32 are shown in greater detail. The array 32 has M pixels in the column direction and N pixels in the row direction. The clock driver CD1 issues three phase clock pulses φ1, φ2, φ3 on the conductors 68, with each of the N rows receiving one set of the clock pulses.

Figure 7:
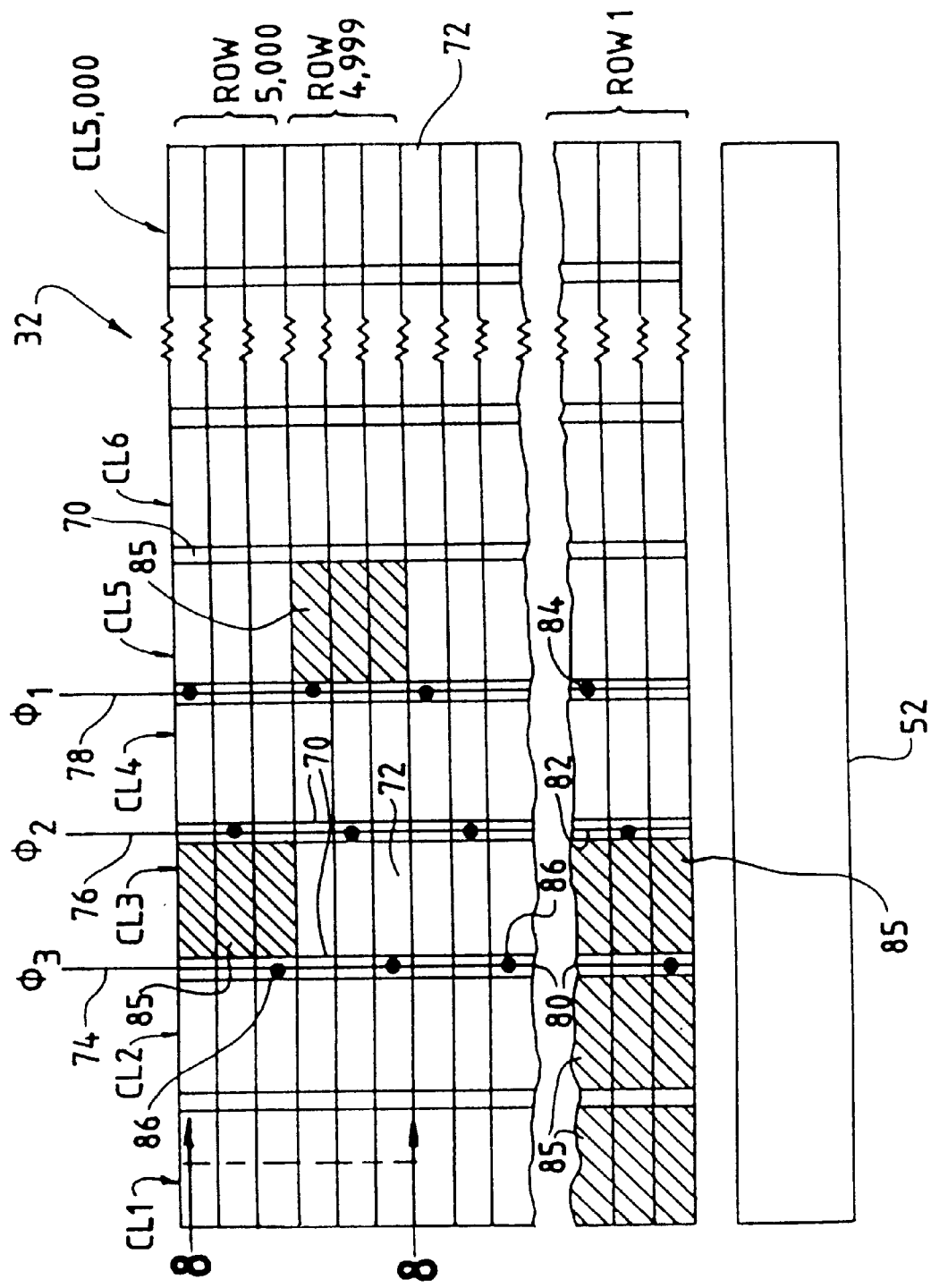
FIG. 7 is a detailed view of one portion of the array showing the construction of the cells of the array in a preferred charge-coupled device embodiment.

FIG. 7 shows in enlarged detail one portion of the imaging array 32. The array 32 has 5000 rows of photosites 85 and 5000 columns of photosites designated CL1–CL5000. Each photosite (shaded region) is bounded by a p+ channel stop 70, which separates each column from the next. Polysilicon horizontal lines 72 subdivide the photosite and bus the three phase clocking signals across the columns. The vertical clock drive pins 74, 76 and 78 are connected to metallization lines 80, 82, 84 which run the entire length of the array in the row direction.

Metal to polysilicon contacts 86 on top of the channel stop regions 70 are provided periodically every third horizontal line throughout the length of the columns to provide the voltage pulses for each row of the array 32. The three phase clocking signals (voltage pulses) transfer the charge packets in the row direction.

Figure 8:
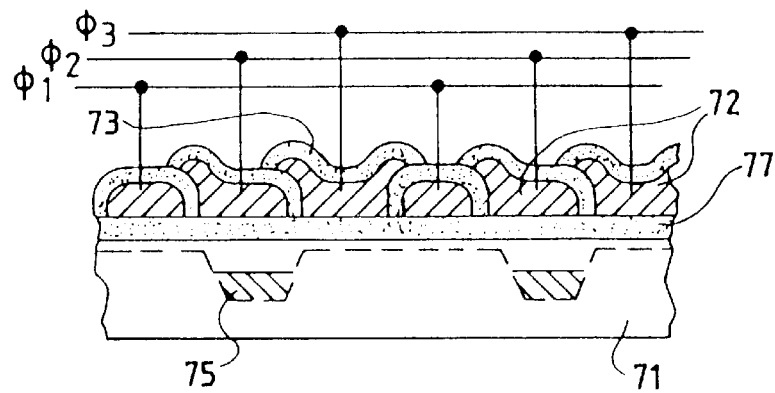
FIG. 8 is cross-sectional view of the array along the lines A—A' of FIG. 7.
Figure 9:
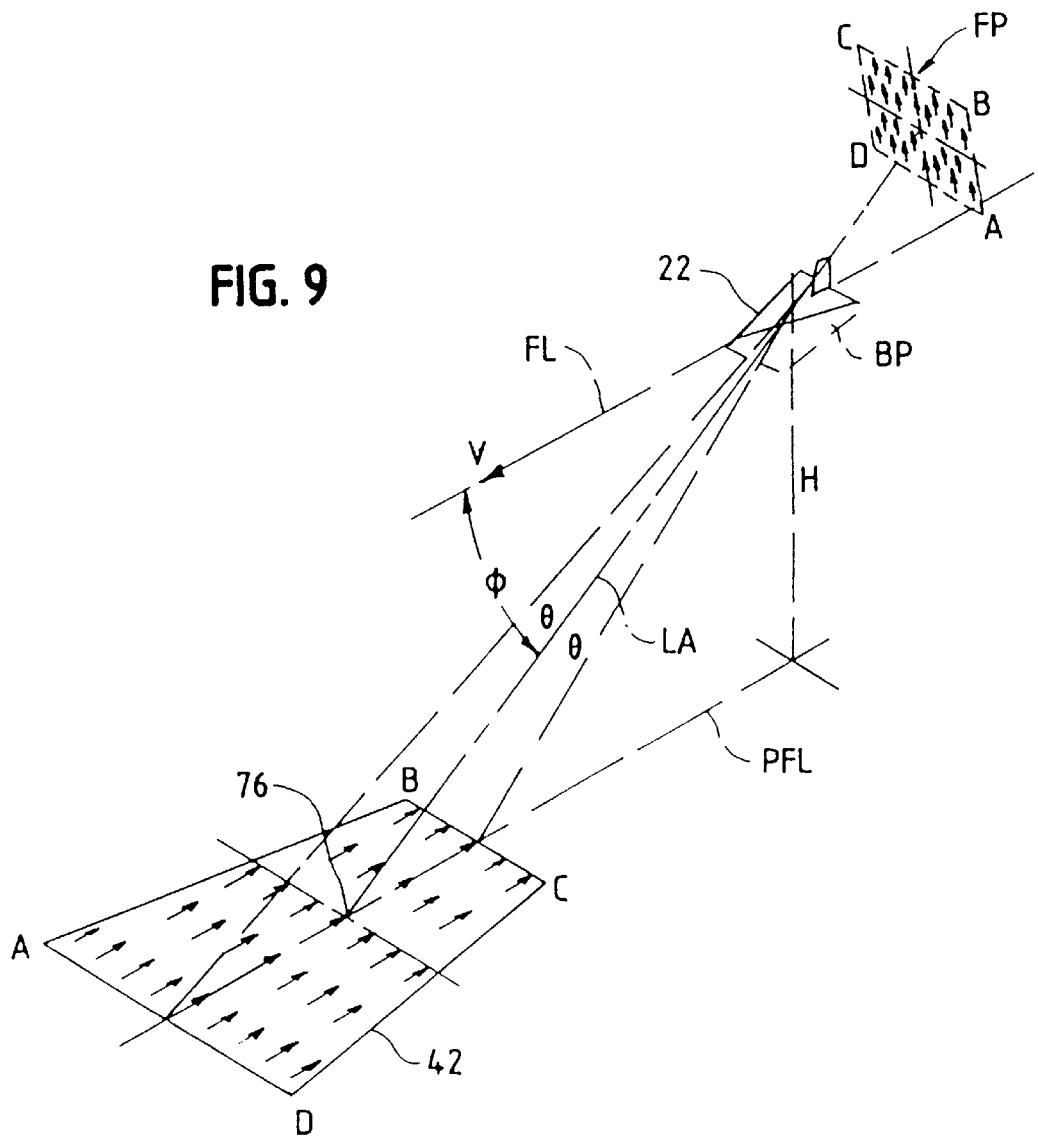
FIG. 9 is a perspective illustration of the reconnaissance aircraft and terrain in the forward oblique orientation of FIG. 1, showing some of the geometrical relationships that are used in computing the proper pixel information transfer rate for the array.

FIG. 8 is a simplified cross-sectional view of the array along the line A–A' of FIG. 7. The polysilicon horizontal lines 72 are pulsed by the 3-phase clocks φ1, φ2, φ3, causing charge packets collected in potential wells 75 in a p-type substrate to be shifted down the array 32. In FIG. 9, the polysilicon horizontal lines are isolated from each other by a silicon dioxide insulating layer 73. Another insulating layer 77 separates the polysilicon horizontal lines 72 from the substrate 71.

The charge coupled device architecture shown in FIGS. 7 and 8 is essentially a full frame imager configuration. This configuration provides a large area array, which enables a high percentage of the silicon wafer area to be available for light collection. By contrast, a frame transfer architecture requires a frame storage region which occupies about the same amount of silicon wafer area as the imaging area, and thus is not considered as desirable an architecture. A non-exclusive list of other possible, but less favored, architectures and designs for the array 32 are an interline transfer array, an X-Y addressable charge injection device, and photo diode detectors. Nevertheless, the teachings disclosed herein can be readily adapted to these other architectures should they be preferred for other reasons (such as sensitivity to particular wavelengths of incident radiation, such as the infra red), and the scope of the present invention is intended to encompass these alternative architectures.

Calculation of Pixel Information Transfer Rates
Forward Oblique Mode in General

Referring now to FIG. 9, the geometry of the scene of interest relative to the aircraft and array during forward oblique reconnaissance is illustrated. The terrain of interest 42 is located directly forward of the aircraft 22. The depression angle φ represents the angle between the plane BP and the lens axis LA that intersects the center 76 of the terrain of interest 42. The points A, B, C and D on the ground are imaged at the corresponding points in the array 32. The arrows on the ground represent image motion. In the forward oblique mode, the image velocity across the array 32 is approximately constant for narrow fields of view. However the image velocity at the top of the array 32 is different from that at the bottom of the array. To maximize image resolution, the image velocity near the center of the array is determined, and the charge transfer rate down the columns of the array is selected to be synchronized at this rate. This provides a selection which is correct at one point, and a best fit compromise for other points in the array. Of course, other points could be chosen and the charge transfer rate selected to be synchronized at those points. The image velocity (Vi) and thus the charge transfer rate, is given by:

$$Vi = F \frac{V \sin^2(\phi + \theta i)}{H \cos^2 \theta i}$$

where F is the focal length of the lens 40, φ is the camera centerline depression angle referenced to the aircraft, θi is a field angle within the field of view, and (φ+θi) is the forward depression angle of the point chosen for synchronization for forward motion compensation.

The charge transfer rate in all the columns of the array 32 is the same in the forward oblique mode. Thus, for horizontal flight/forward oblique operation, the computer 34 calculates a charge transfer or line rate (f) which is given by:

$$f = \frac{(F)}{Px} \frac{(V)}{H} \frac{\sin^2(\phi + \theta i)}{\cos^2 \theta i}$$

The counter value for the counter CN1 is given by X/f; where X is the master clock frequency. After the counter values are loaded into the counter CN1 and the shutter opens, the counter CN1 begins counting, and the clock driver CD1 is triggered when the counter value is reached. Then, the counter reloads and the cycle of counting and triggering is repeated during the exposure period until the exposure period ends.

Correction for Pitch Angle and Rate

In order to maximize the pilot's survivability, assuming a medium to high threat scenario, and maximize the probability of target coverage given the uncertainties of weather, target location and relocatable threats, the pilot takes a sequence of images while pulling up the nose of the aircraft (i.e., pitching). In performing this maneuver, it is necessary to both point the lens 40 accurately and keep an appropriate distance from the target (typically 6–12 thousand feet) in order to avoid small arms and AAA threats. The dive bomb maneuver of FIG. 1 introduces pitch angle and pitch rate components to the forward motion compensation relationship described above for forward oblique operation. The image motion rate in the focal plane of the array 32, f, is given by the modified equation:

$$f = \frac{F}{Px} \frac{(V/H) \cos \alpha \sin^2(\phi + \alpha + \theta i) + \omega}{\cos^2 \theta i}$$

where Px is the pixel size, F is the lens focal length, ω represents the angular pitch rate (typically 15–25 degrees per second) of the aircraft during the pull out of the dive, α is the aircraft pitch angle during the exposure, and θi is the field angle within the field of view of the point chosen for synchronization, and φ is the camera centerline depression angle referenced to the aircraft.

After the computer 34 calculates the image motion rate f, the counter preload (terminal count value) signal CV is calculated:

CV=X/f where X is the master clock frequency. This signal is sent to the counter CN1 in the drive and control electronics 54. The cycle of counting and triggering the clock driver CD1 proceeds as described above.

TABLE 1

| Frame No. | (5) Image Velocity mm/s | (1)(5) Image Smear mm | (2)(5) Image Smear mm | (3)(5) Image Smear mm | (3) Line Rate Lines/sec |
|---|---|---|---|---|---|
| 1 | 10.21 | .051 | .012 | .012 | 851 |
| 2 | 10.39 | .052 | .012 | .012 | 868 |
| 3 | 10.55 | .053 | .012 | .012 | 879 |
| 4 | 88.73 | .444 | .399 | .012 | 7394 |
| 5 | 86.87 | .434 | .399 | .012 | 7239 |
| 6 | 84.89 | .424 | .399 | .012 | 7074 |
| 7 | 83.03 | .415 | .399 | .012 | 6919 |
| 8 | 81.50 | .408 | .399 | .012 | 6792 |

NOTES:
1. No FMC or pitch rate correction
2. FMC only correction
3. FMC plus pitch rate correction
4. Exposure time = .005 second
5. At center of CCD array
CONDITIONS FOR TABLE 1
Focal length = 12 inches
Aircraft Angle of Attack = 30°
φ Sensor Depression Angle = 15° below water line
Aircraft Velocity = 1000 ft/sec.
Aircraft Altitude = 12,912 ft at position 1
= 12,000 ft at position 8
Aircraft Pitch Rate = ω = 15°/second - starting at position 3

Table 1 shows for each frame depicted in FIG. 1 the corresponding image velocity at the focal plane, the image smear at the center of the focal plane array (where θ is zero), the image smear with only FMC correction, the image smear with both FMC and pitch rate correction as provided herein, and the pixel information transfer rate for FMC plus pitch rate correction. In the present example, the exposure period is 0.005 second and the framing interval is 0.4 seconds between frames (frame rate of 2.5 frames per second).

When the operator triggers a frame to take a picture, the shutter is simultaneously opened for an exposure time period calculated by the computer 34. The computer 34 calculates f and CV and sends the pre-load signal to the counter CN1. At the same time, the counter CN in the drive and control electronics 54 begins counting at the master clock frequency X to the pre-load counter value. When the counter has counted to the pre-load counter value, the trigger signal is sent from the counter to the clock driver CD, and one cycle of three phase clocking is triggered in the array 32. Pixel information (charge packets containing scene information) is transferred one row vertically across the array 32. The counter resets and the process of counting and triggering repeats continuously during the scene exposure period.

Using frame number 6 from Table 1 as an example, an image velocity of 84.89 mm/sec translates to a line rate f (pixel information transfer rate) of 7,074 lines per second, given a pixel pitch Px of 0.012 mm. If the exposure period is 0.005 second, this means that pixel information in each row must be transferred by 35.37 rows during the exposure time. More precisely, the charge packets must be moved by one pixel in the vertical direction every 0.05/35.37 seconds.

To do this, and assuming that the clock 58 has frequency of 10 Mhz, the integration time of 0.005 seconds results in 50,000 master clock counts during the exposure time period. The counter value for the counter CN1 is thus 50,000/35.37, or 1,414. At the moment of opening the shutter, the counter CN1, having been set to zero, starts counting at the master clock rate up to 1,414. When this number is obtained, the clock driver CD1 is triggered, causing one row of pixel information to be transferred repeatedly. The counter CN1 is reset and begins counting up to 1,414. The process repeats 35 complete times during the exposure period. As a result, the forward motion compensation and pitch rate compensation is performed electronically in the array with no moving parts. Of course, the process described for frame 6 is performed for each of the frames in FIG. 1, based on the line transfer rate f calculated by the computer 34 based on current aircraft motion and altitude information. The time rate of change of pitch, i.e., the value ω, is preferably calculated from the values of pitch and the framing interval according to a simple mathematical software routine implemented in the computer 34. Alternatively, ω could be supplied directly by the avionics system or an inertial navigation system. Preferably, the entire process of calculating the pixel information transfer rate and counter values CV according to the above procedure is performed by a software routine in the camera control computer 34.

Improvement in Image Resolution Provided by Pitch Rate FMC

The values in Table 1 show numerically the benefit of including both FMC and the pitch rate compensation in the array 32. In the example, the resultant image smear for frame 5 is reduced from 0.434 mm, for an array without FMC or pitch rate compensation, to 0.012 mm for an array in accordance with the preferred embodiment described herein. This represents a improvement from 36 pixels of image smear (for pixels of 0.012 mm size), in the array without FMC or pitch rate compensation, to an image smear on the order of a single pixel in accordance with the invention.

Figure 10:
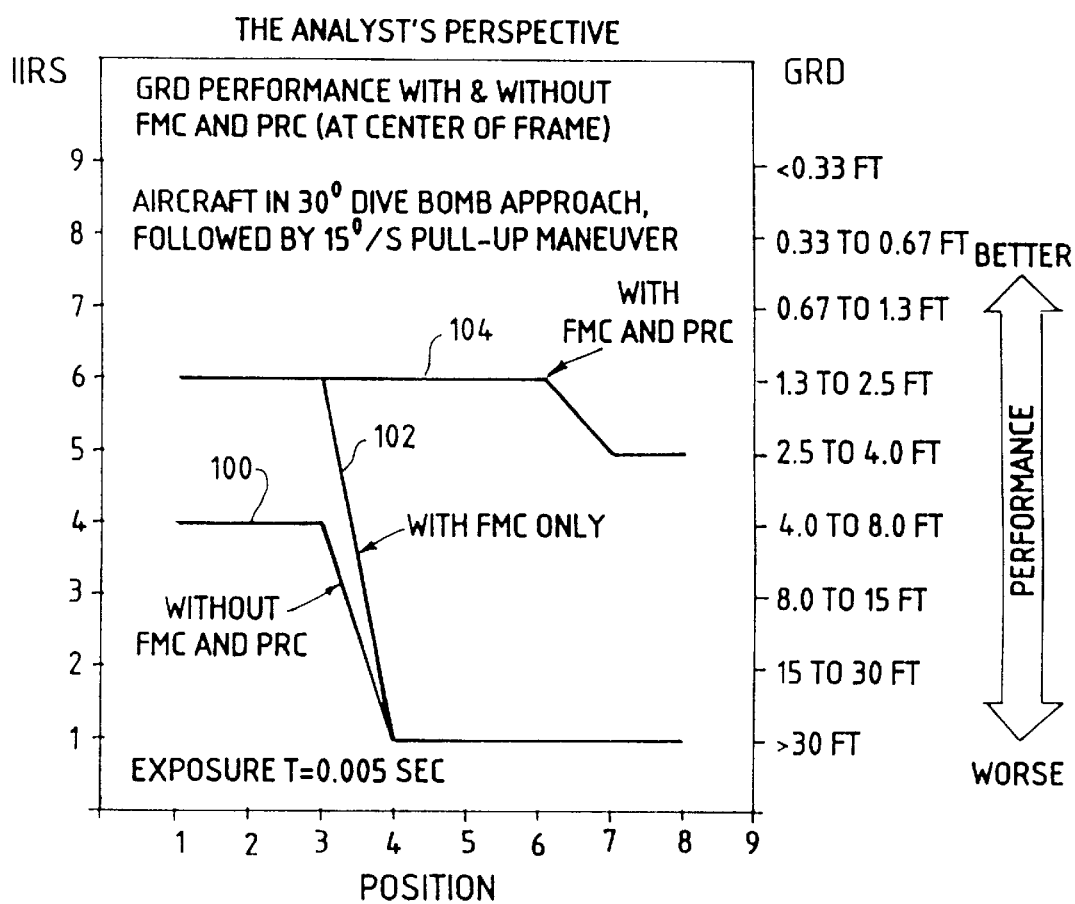
FIG. 10 is a graphical illustration of the Image Interpretability Rating Scale (IRS) and Ground Resolvable Distance (GRD) for the 8 frames of imagery taken by the camera system in accordance with the invention for the conditions set forth in the representative example given in Table 1 and FIG. 1, as compared to the IIRS and GRD for a prior art electro-optical imaging array under the same conditions that (1) performed forward motion compensation only (no pitch rate compensation) and (2) an electro-optical imaging array which does not perform forward motion compensation or pitch rate compensation

Referring to FIG. 10, there is illustrated a graph of Image Interpretability Rating Scale (IIRS) and ground resolvable distance (GRD) for each of the 8 frames of images generated at positions 1–8 of FIG. 1, for two prior art camera systems and a camera system in accordance with the present invention. The conditions for the graph of FIG. 10 are as set forth in the representative example given above in table 1.

It can be seen from FIG. 10 that a prior art camera system without FMC and pitch rate compensation (curve 100) would obtain IIRS level-4 performance for the first 3 frames, and then only level-1 performance for the remaining frames. Ground resolvable distances would, at best, be only 4–8 feet for the first three frames, and then greater than 30 feet for the remaining frames. The sharp decline in performance between the third and fourth frames is indicative of the dramatic effect that changes in pitch rate have on image motion rates during the maneuver of FIG. 1.

A camera with forward-oblique FMC only (curve 102) would obtain URS level-6 performance for the first three frames as the aircraft approaches the scene of interest, but at frame 4 when the aircraft begins to pull out of the dive, the performance degrades to the same level-1 performance provided by a camera that has no image motion compensation at all.

A camera system that utilizes the pitch rate image motion compensation plus forward motion compensation, as described herein (curve 104), achieves a superior IIRS and GRD level of performance not only during the approach (frames 1–3) but also during the pull out from the dive (frames 4–8) when the image motion is the greatest. The URS and GRD do drop slightly from frames 6 to frames 7 and 8 due to increasing range, but this is still a vast improvement over the other approaches. For example, the GRD of the camera system of the present invention achieves a roughly 10-fold improvement over a system implementing FMC only, with no pitch rate correction.

While presently preferred embodiments of the invention have been set forth herein, persons of skill in the art will appreciate that various modifications and alternative arrangements may be made to the array and electronics circuitry described herein without departing from the true spirit and scope of the invention. This true scope and spirit is defined by the appended claims.

We claim:

1. An electro-optical camera system with electronic image motion compensation, said camera system suitable for installation in a reconnaissance aircraft having a navigation system determining the velocity, height, and pitch information of said aircraft during a reconnaissance maneuver, said pitch information comprising a pitch angle of said aircraft relative to a horizontal frame of reference and a rate of change of said pitch angle, comprising, in combination, an array of photosensitive cells arranged in rows and columns, said cells storing pixel information representing a scene of interest, said array of cells having a drive circuit supplying pulses to said array to transfer pixel information stored in said cells from one row to an adjacent row;

a camera control computer responsive to said navigation system for computing a pixel information transfer rate for said array of cells based on said velocity, height, pitch angle and rate of change of said pitch angle;

said camera control computer further determining from information supplied by said navigation system a pixel information transfer rate for said array of cells during a period of time in which said aircraft is experiencing a substantial non-zero rate of change of the pitch of said aircraft and said array is oriented in a forward oblique orientation relative to said aircraft;

said camera control computer and control circuitry adjusting the charge transfer rate of said array to substantially match the rate of image motion of said terrain of interest during a series of successive exposures of said array to said terrain of interest during said period of time in which said aircraft is experiencing said substantial non-zero rate of change in the pitch of said aircraft;

wherein said array may generate a series of images of said terrain of interest while compensating for said substantial non-zero rate of chance of the pitch angle of said aircraft during the successive exposures of said array and wherein the resolution of said images may be preserved.

2. The camera system of claim 1, wherein said array of cells comprises a charge-coupled device.

3. The camera system of claim 1, wherein said camera system is installed in a military reconnaissance aircraft.

4. The camera system of claim 2, wherein said array of cells comprises a rectangular array having at least 4,000,000 cells arranged in rows and columns.

5. The camera system of claim 2, wherein said drive circuit is responsive to said camera control computer and further comprises at least one counter receiving a counter signal from said camera control computer and a clock driver responsive to said counter, said clock driver supplying voltages to a set of conductors placed adjacent to said cells so as to cause pixel information stored in said cells to be transferred from one row to an adjacent row in said array.

6. A method of imaging a scene of interest by an aerial reconnaissance camera system installed in an aircraft, said aerial reconnaissance camera system comprising an array of photosensitive cells arranged in rows and columns and a camera control computer for controlling the operation of said array, said aircraft having a navigation system for providing information as to the velocity, height, and pitch information of said aircraft relative to the earth, said pitch information comprising a pitch angle of said aircraft relative to a horizontal frame of reference, comprising the steps of:

descending towards the earth with said aircraft making a pitch angle with respect said horizontal frame of reference in a dive maneuver and then pulling out of said dive, with said aircraft experiencing a substantial non-zero rate of change of pitch during the step of pulling out of said dive;

supplying from said navigation system the current velocity, height and pitch angle of said aircraft to said camera control computer, obtaining the current rate of change of the pitch angle of said aircraft;

calculating a pixel information transfer rate for said array of cells from said current velocity, height and pitch angle and said current rate of change of the pitch angle of said aircraft that is substantially equal to the rate of motion of an image of said scene of interest on the focal plane of said array; and during said step of pulling out of said dive, exposing said array of cells to radiation from said scene of interest in a series of exposures taken in rapid succession and simultaneously transferring pixel information in said array of cells row by row in accordance with said pixel information transfer rates calculated for each of said exposures such that the resolution of an image generated by said array of cells is preserved.

7. The method of claim 6, wherein said array comprises a charge-coupled device.

8. The method of claim 6, further comprising the steps of exposing said array in a rapid sequence of exposures so as to generate a set of sequential images from said array of said terrain of interest during a time period in which said rate of change of pitch of said aircraft is substantially non-zero.

9. The method of claim 8, wherein said aircraft defines a roll axis and wherein said camera system is oriented relative to said aircraft in a forward oblique angle relative to said longitudinal axis, wherein said forward oblique angle is substantially constant relative to said longitudinal axis during said sequence of exposures.

10. An electro-optical aerial reconnaissance camera for an aircraft having an array of photosensitive cells storing pixel information representing a scene arranged in rows and columns and a camera control computer for determining a rate at which said pixel information should be transferred in said array in order to be in substantial synchronism with an image of said scene directed onto said array, said camera control computer supplying signals to a clocking circuit transferring said pixel information in said array at said rate, the improvement comprising:

a software routine for said camera control computer determining a pixel information transfer rate for said array when said aircraft is flown in a manner such that the aircraft is subject to a substantial non-zero rate of change of the pitch attitude of said aircraft for more than a transitory period of time during which said array is exposed to said scene and in which said camera is oriented in a forward oblique manner, said software routine processing information including the current pitch angle of said aircraft and the rate of change of the pitch angle of said aircraft to determine pixel information transfer rates for said array;

said camera control computer and clocking circuit responsive to said software routine so as to transfer said pixel information in said array in substantial synchronism with said image of said scene to thereby preserve resolution of an image generated by said array.

11. A method for imaging a scene of interest with an electro-optical imaging array camera system installed in a reconnaissance aircraft, the improvement comprising:

approaching the scene of interest at a pitch angle in which the aircraft makes a depression angle relative to a horizontal frame of reference;

pulling out of said approach by decreasing said pitch angle of said aircraft, and simultaneously during said pulling out of said approach:

(a) exposing said array to said scene in a plurality of discrete exposures;

(b) calculating a pixel information transfer rate for each exposure based on at least the velocity, height, pitch angle of the aircraft, and rate of change of pitch angle;

(c) transferring pixel information in said array of cells at a rate during each exposure based on said calculated pixel information transfer rate;

(d) adjusting the pixel information transfer rate between said successive exposures; and (e) reading out said pixel information from said array of cells after each of said successive exposure of said array;

wherein a series of high resolution images having image motion compensation of said scene of interest may be generated by said array.

* * * * *